(12) United States Patent (10) Patent No.: US 7,545,124 B2
Lowrie et al. (45) Date of Patent: Jun. 9, 2009

(54) CONNECTING A PRIME MOVER DRIVEN ALTERNATOR TO A CIRCUIT WITH AN EXISTING ALTERNATING CURRENT

(75) Inventors: James Robert Lowrie, Derby (GB); Wayne Kenneth Aldridge, Granby (GB)

(73) Assignee: Microgen Energy Limited, Reading, Berkshire (GB)

( * ) Notice: Subject to any disclaimer, the term of this patent is extended or adjusted under 35 U.S.C. 154(b) by 117 days.

(21) Appl. No.: 11/630,233

(22) PCT Filed: Jul. 11, 2005

(86) PCT No.: PCT/GB2005/002753

§ 371 (c)(1), (2), (4) Date: Dec. 20, 2006

(87) PCT Pub. No.: WO2006/005956

PCT Pub. Date: Jan. 19, 2006

(65) Prior Publication Data

US 2008/0036428 A1 Feb. 14, 2008

(30) Foreign Application Priority Data

Jul. 9, 2004 (GB) ................................. 0415454.8

(51) Int. Cl.
*H02P 9/00* (2006.01)
(52) U.S. Cl. ......................................... 322/27; 322/25
(58) Field of Classification Search .................. 322/10, 322/20, 22, 27, 28, 29, 37; 307/64
See application file for complete search history.

(56) References Cited

U.S. PATENT DOCUMENTS

| 4,482,812 | A | * | 11/1984 | Hori et al. | ................. | 290/38 R |
| 5,998,976 | A | * | 12/1999 | Steffan | ........................ | 322/10 |
| 6,420,793 | B1 | * | 7/2002 | Gale et al. | ..................... | 290/34 |
| 6,844,706 | B2 | * | 1/2005 | Pinkerton et al. | ............. | 322/29 |
| 7,080,449 | B2 | * | 7/2006 | Aldridge et al. | ................ | 29/854 |
| 7,180,200 | B2 | * | 2/2007 | Walter et al. | ................ | 290/1 A |
| 7,367,302 | B2 | * | 5/2008 | Bolz et al. | ................ | 123/179.3 |
| 7,425,818 | B2 | * | 9/2008 | Silcock et al. | ................ | 322/29 |

FOREIGN PATENT DOCUMENTS

| GB | 2 360 402 | 9/2001 |
| WO | WO 01/069078 | 9/2001 |

* cited by examiner

*Primary Examiner*—Nicholas Ponomarenko
(74) *Attorney, Agent, or Firm*—Ballard Spahr Andrews & Ingersoll, LLP (57) ABSTRACT

Apparatus and method are provided, for connecting prime mover driven alternator to circuit that has an existing alternating current. Alternator is connected to circuit when minimum current flows to or from alternator. The actual current is measured by controller following connection and the value of this current is used to determine the optimal connection conditions when alternator is next connected. Alternator is disconnected by controller by running down prime mover, monitoring the current and stalling prime mover when the current flow is at a minimum.

4 Claims, 10 Drawing Sheets

CONNECTING A PRIME MOVER DRIVEN ALTERNATOR TO A CIRCUIT WITH AN EXISTING ALTERNATING CURRENT

CROSS REFERENCE TO RELATED APPLICATIONS

The present application claims priority to Great Britain Patent Application No. 0415454.8 filed Jul. 9, 2004, which application is incorporated herein fully by this reference.

The present invention relates to a method of connecting a prime mover driven alternator to a circuit with an existing alternating current. The present invention also relates to a method of disconnecting a prime mover driven alternator from such a circuit, and to apparatus for such connecting and disconnecting. In particular, the present invention relates to an alternator driven by a Stirling engine to be connected and disconnected to an alternating current mains electricity supply.

Figure 1:
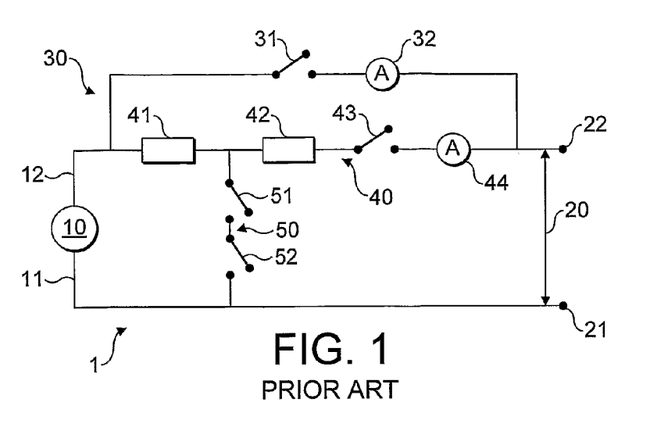
FIG. 1 shows a connector arrangement for connecting a prime mover driven alternator to a circuit with an existing alternating current according to the prior art.

Apparatus for connecting a Stirling engine driven alternator to an ac mains supply is disclosed in our International Patent Application No. PCT/GB01/00840 and a modification thereof is disclosed in our U.K. Patent Application No. 0402587.0. FIG. 1 of the former application is reproduced herein as FIG. 1 and shows a linear alternator 10 that is driven by a Stirling engine (not shown). The mains supply is shown at 20 between neutral 21 and live 22. The alternator 10 is connected between neutral 21 and live 22 through two parallel paths 30 and 40. The first electrical path 30 has a switch 31 and a meter 32 in series. The second electrical path 40 has a first impedance 41, a second impedance 42, a switch 43 and a meter 44 connected in series in that order. A line 50 extends between impedances 41 and 42 to connect to neutral 21 via two switches 51 and 52.

Connection to the mains supply 20 is achieved through a sequence of stages corresponding to various arrangements of the switches 31, 43, 51 and 52. In particular, the switch 43 allows the alternator 10 to be connected to the mains supply 20 initially through impedances 41 and 42 thereby limiting the current passing through the alternator 10. This ensures that an appropriate force is exerted on the piston of the Stirling engine to initiate its stroke, i.e. a sufficient force is provided to initiate the movement but that is not so large as to cause the piston to be driven into the walls of the piston chamber. The engine may then be connected directly to the mains supply 20 through path 30. The alternator 20 is disconnected from the mains supply only after the alternator 10 is stalled by placing impedance 41 across live 22 and neutral 21.

The mains supply 20 is used to initiate the piston stroke of the Stirling engine, and so the Stirling engine should be in an operational condition to be able to maintain the reciprocating motion of the piston upon connection of the alternator 10 to the mains supply 20. Specifically, a burner of the Stirling engine is fired to heat one end of the piston cylinder and to raise the temperature of the Stirling engine prior to connection to the mains supply 20. There is an optimum time to connect the alternator 10 to the mains supply that is related to the operational condition of the Stirling engine.

When Stirling engine operation is no longer required, the burner is extinguished and the Stirling engine is allowed to run down. The alternator 10 is disconnected from the mains supply 20 during the running down process and, again, there is an optimum time for doing so.

It is an object of the present invention to improve on this background and, in particular, to provide connection to and disconnection from the mains supply with improved timing.

Against this background, and from a first aspect, the present invention resides in a method of connecting a prime mover driven alternator, arranged to generate a current between two terminals, to an alternating current circuit with an existing alternating current, the method comprising the steps of:

(a) initialising the prime mover so that it reaches a suitable condition to drive the alternator at the frequency of the alternating current in the circuit to which it is to be connected;

(b) measuring a parameter indicative of the amount of electricity that will be supplied or drawn by the alternator when connected to the alternating current circuit;

(c) connecting the terminals of the alternator to a circuit with an existing alternating current to cause the alternator to start movement of the prime mover when the measured parameter reaches a predetermined threshold;

(d) measuring the amount of electricity supplied or drawn by the alternator substantially immediately upon connection; and (e) updating the value of the predetermined threshold in accordance with the measured amount of electricity.

The Applicant has realised that the optimum time to connect the alternator to the alternating current circuit is related to the amount of electricity drawn from or supplied to the alternating current circuit immediately after connection. If the connection is made too early, the prime mover draws electricity from the alternating current to maintain its motion. If the connection is made too late, the alternator starts delivering significant amounts of electricity to the alternating current circuit straightaway, and hence energy produced by the prime mover is wasted. Accordingly, the optimum time for connection has been found to be when the alternator neither draws nor supplies electricity from the alternating current circuit.

Preferably, the prime mover is a Stirling engine, for example in use in a domestic combined heat and power unit. Such units provide heat to homes, but also generate electricity that is used to supply the home and that is also sold back into the mains supply. In this context, connecting to the alternating current circuit (the mains supply) too late is uneconomical in that electricity that could be sold is not and connecting too early is uneconomical in that electricity is drawn from the mains supply that must be paid for. Moreover, there is a further adverse result in connecting at a non-optimum time in that initiation of the piston stroke may be performed with too much force. This will result in the piston travelling beyond its designed range of movement and this may in turn result in damage to the Stirling engine or undesirable noise.

Thus, the Applicant has realised that the optimum time for connecting the alternator to the mains supply is such that the alternator neither draws nor supplies electricity from/to the mains supply upon connection. Unfortunately, to determine this optimum time requires first connecting the alternator to the alternating current circuit: if the alternator draws electricity, you know you have connected too soon and if the alternator supplies significant amounts of electricity straightaway, you know you have connected too late. The Applicant has realised two approaches around this problem, both relying upon initial calibration of the prime mover engine (or a unit representative of a production run of units, or the like). These approaches will be described in the context of a Stirling engine being connected to a mains supply, but are of course applicable in a general sense. The first approach is to record the time from initialising the Stirling engine to connection and adjusting this in response to the electricity flow measured upon connection. The second approach is based on the realisation that whether the alternator draws or supplies electricity is related to the temperature of the Stirling engine. Accordingly a temperature can be used to trigger connection: the optimum temperature can be found empirically. Thus, time or temperature may correspond to the parameter that is indicative of the amount of electricity that will be supplied or drawn by the alternator when connected to the alternating current circuit. Once a unit (or a representative unit) has been calibrated, it is sent out for delivery configured to operate such that connection is performed according to the predetermined timing or temperature.

Although this approach works well, it is subject to some inaccuracy. For example, where a representative unit is calibrated, differences in prime mover quality can affect operational efficiency. Also, the temperature measurement method relies on even distribution within the Stirling engine, and this is not always the case. Moreover, a one-off calibration of the Stirling engine is not ideal in that any variability in the performance of an engine over its lifetime will lend to a drift away from optimum timing for connection to the mains supply.

Hence, it is preferred that the method according to the first aspect of the invention is performed not only upon initial calibration of a prime mover, but also subsequently in the life of the prime mover. For example, the method may be performed when the prime mover is in operation on site. The method may optionally be performed every time connection is made or it may be performed at regular or irregular periodic intervals. Moreover, the method may be performed throughout the whole lifetime of the prime mover or it may be performed in a select period or select periods of its lifetime.

Optionally, updating the value of the predetermined threshold further comprises increasing or decreasing the predetermined value if the measured amount of electricity shows that electricity is being drawn from or supplied to the alternating current circuit respectively. Preferably, the predetermined threshold is increased or decreased in proportion to the amount of electricity being drawn from or supplied to the alternating current circuit. The proportionate relationship may take one of many forms, e.g. a linear relationship, quadratic relationship, exponential relationship, etc.

Optionally, measuring the amount of electricity supplied or drawn by the alternator comprises measuring the voltage of the alternator and the current flow into or out from the alternator. Preferably, a measure of the product of the voltage and current is used to update the predetermined threshold. It has been found that the product of the voltage and current should be zero at the optimum connection time. Accordingly, the predetermined threshold may be adjusted in proportion to how much the voltage/current product deviates from zero. In practice, connection leading to a range of voltage/current products about zero may be acceptable, e.g. ±50 VA.

The present invention also extends to a method of collecting a data file comprising repeatedly connecting a prime mover driven alternator to an alternating current circuit in accordance with any of the methods described above; and logging the value of the predetermined threshold each time connection is made. Data need not be logged every single time a connection is made. For example, data may be logged periodically as this will still allow trends to be identified. The present invention also extends to a data file so collected.

Moreover, the present invention extends to a method of monitoring the performance of a prime mover arranged to drive an alternator thereby to generate a current between terminals that are connected to an alternating current circuit with an existing alternating current, the method comprises determining the variation over time of values of the predetermined threshold logged in such a data file; and analysing the determined variation to identify any trends indicative of a fault in the prime mover. A fault in the prime mover may well become apparent from a number of different types of trends in the logged data. Excessive variation or gradual drifts may indicate a fault, as may a sudden trend to an extreme value.

According to a second aspect, the present invention resides in a method of disconnecting a prime mover driven alternator from an alternating current circuit with an existing alternating current while the prime mover is running down such that the amount of electricity being supplied by the alternator to the alternating current circuit is dropping, the method comprising:

(a) monitoring the amount of electricity supplied or drawn by the alternator while it is running down;

(b) stalling the prime mover when the alternator substantially neither supplies nor draws power from the alternating current circuit; and (c) disconnecting the alternator from the circuit with an existing alternating current.

The disconnection procedure is more straightforward in that the alternator is connected to the alternating current circuit and so the amount of electricity it draws or supplies can be measured directly before disconnection. According to this aspect of the invention, the prime mover is being run down such that the amount of electricity it supplies to the alternating current circuit is falling. This flow of electricity is monitored and, when it falls to substantially zero, disconnection is performed. Thus, electricity may be sold into a mains supply or the like for as long as possible and disconnection is performed substantially at the last moment before electricity is drawn from the mains supply. Clearly, the optimum time to disconnect is when the flow of electricity is exactly zero, but it will be abundantly clear that advantages will also be provided over a range about zero. For example, the amount of electricity may be determined from the product of the voltage of the alternator and the current flowing through the alternator: determined this way, a range of ±50 VA has been found convenient for triggering the disconnection process. That said, other ranges may also be found advantageous, e.g. ±40 VA, ±30 VA, ±20 VA, ±10 VA or ±5 VA may all be employed.

Preferably, step (b) comprises connecting an impedance in parallel with the prime mover driven alternator having a sufficiently low impedance value to require a current in excess of that which the alternator is able to deliver to prevent the prime mover from driving the alternator and thus stalling the prime mover.

Optionally, the prime mover is a Stirling engine such as a Stirling engine of a domestic combined heat and power unit. Running the Stirling engine down preferably comprises turning a heater of the Stirling engine off so that the Stirling engine gradually runs down as it uses up the heat held in the engine.

The present invention also extends to a method of collecting a data file comprising repeatedly disconnecting a prime mover driven alternator from an alternating current circuit as described above; and logging the time taken during running down of the prime mover substantially until the alternator neither supplies nor draws power from the alternating current circuit. The time taken may be determined from a variety of start points provided they are largely consistent, e.g. when a burner powering the prime mover is turned off. What is important is to record how far into the running down period the disconnection procedure occurs. Disconnection can be determined relative to the actual disconnection itself or when the alternator is determined neither to supply nor draw power from the alternating current circuit. The present invention also extends to a data file so collected.

Moreover, the present invention extends to a method of monitoring the performance of a prime mover arranged to drive an alternator thereby to generate a current between terminals that are connected to an alternating current circuit with a existing alternating current, the method comprising determining the variation over time of times logged in such a data file; and analysing the determined variation to identify any trends indicative of a fault in the prime mover.

From a third aspect, the present invention resides in a controller operative as part of a connector arrangement to connect a prime mover driven alternator to an alternating current circuit with an existing alternating current, wherein the controller is operative to receive a parameter indicative of the amount of electricity that will be supplied to or drawn from the alternating current circuit by the alternator when connected thereto; to compare the parameter with a stored threshold value; to connect the alternator to the alternating current circuit when the parameter reaches the threshold value; to receive a measurement of the amount of electricity supplied to or drawn from the alternating current circuit by the alternator upon connection; and to adjust the stored threshold value in accordance with the measurement such that less electricity should be supplied to or drawn from the alternating current circuit by the alternator when next connected thereto.

The controller may be implemented in hardware or software form, e.g. a personal computer when suitably programmed. The present invention also extends to a computer program comprising program instructions that, when loaded into a computer, produce a controller as described above, and also to a computer program product comprising such a computer program.

From a fourth aspect, the present invention resides in a connector arrangement operative to connect a prime mover driven alternator to an alternating current circuit with an existing alternating current, the connector arrangement comprising the controller described above; parameter means operative to provide the parameter indicative of the amount of electricity that will be supplied to or drawn from the alternating current circuit by the alternator when connected thereto; and meter means operative to provide the measurement of the amount of electricity supplied to or drawn from the alternating current circuit by the alternator.

From a fifth aspect, the present invention resides in a controller operative as part of a connector arrangement to disconnect a prime mover driven alternator from an alternator current circuit with an existing alternating current, wherein the controller is operative to receive a measurement of the amount of electricity supplied to or drawn from the alternating current circuit by the alternator; and to disconnect the alternator from the alternating current circuit when the measurement indicates that substantially no electricity is being supplied or drawn by the alternator.

The controller may be implemented in hardware or software form, e.g. a personal computer when suitably programmed. The present invention also extends to a computer program comprising program instructions that, when locked into a computer, produce a controller as described above, and also to a computer program product comprising such a computer program.

From a sixth aspect, the present invention resides in a connector arrangement operative to disconnect a prime mover driven alternator from an alternator current circuit with an existing alternating current, the connector arrangement comprising the controller described above; and meter means operative to provide the measurement of the amount of electricity supplied to or drawn from the alternating current circuit by the alternator.

Other preferred, but optional, features are set out in the appended claims.

An example that illustrates the present invention will now be described with reference to the accompanying drawings in which:

FIGS. 2a to 7a show a connector arrangement for connecting a Stirling engine driven alternator to a mains electricity supply according to an embodiment of the present invention, the different Figures showing various switching configurations;

FIGS. 2b to 7b show the corresponding circuits of FIGS. 2a to 7a as simplified equivalent circuit diagrams;

Figure 2A:
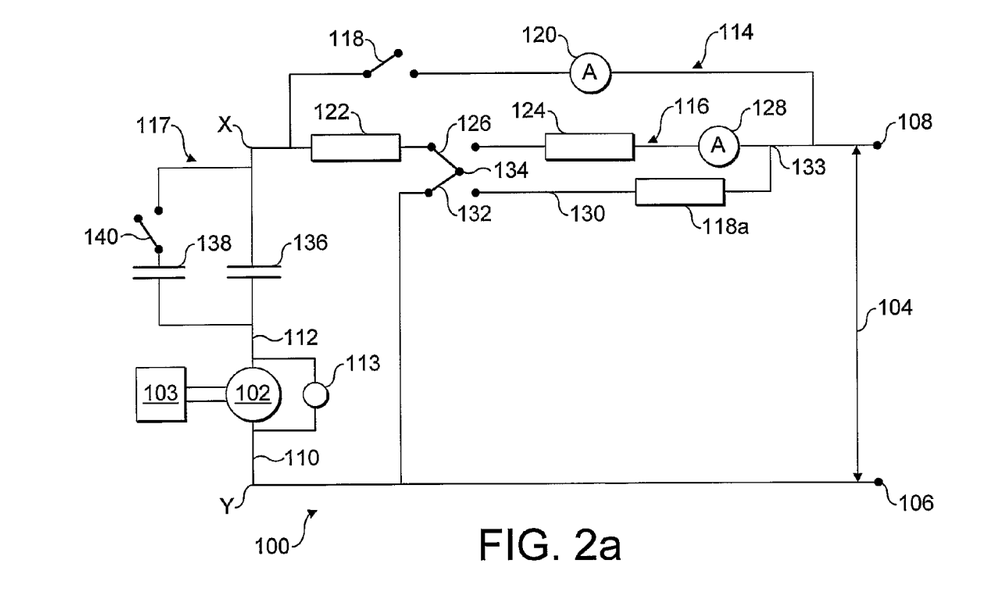

A connector arrangement 100 for connecting and disconnecting a prime mover driven alternator 102 to a circuit with a mains electricity supply 104 is shown in FIG. 2a. The connector arrangement 100 contains an alternator 102 that is driven by a Stirling engine 103 in this example. However, any other suitable prime mover such as a gas engine, internal combustion engine or a steam turbine would be suitable. Any suitable alternator may be used, as will be immediately evident to a person skilled in the art, although a linear alternator is presently preferred as it is found to work well with a reciprocating engine such as a Stirling engine 103. The mains electricity supply is shown at 104 and extends between neutral 106 and live 108: the mains supply 104 acts as a circuit with an existing alternating current.

The alternator 102 has two terminals 110 and 112, one of which 110 is connected to neutral 106 and the other terminal 112 is connectable to the live 108 of the mains supply 104. A voltmeter 113 placed across terminals 110 and 112 allows the voltage across the alternator 102 to be measured. The terminal 112 is connectable to the mains supply 104 via a capacitor arrangement 117, by two parallel paths 114 and 116. The capacitor arrangement 117 can be adjusted to provide a circuit with an adjustable resonance, thereby allowing the connector arrangement 100 to be tuned or detuned relative to the initial operating conditions of the Stirling engine 103, as will be described in further detail below. The first electrical path 114 comprises a relay switch 118 and a current meter 120 in series. The second electrical path 116 has a first impedance 122, a relay switch 126, a second impedance 124 and a current meter 128 in series in that order. In this example, the first impedance 122 is 27Ω and the second impedance 124 is 10Ω.

As can be seen from FIG. 2a, an electrical path 130 extends from beyond the meter 128 to connect the neutral 106 to path 116 at two connection points 133 and 134. Connection point 133 is located on the mains supply-side of electrical meter 128, whereas connection point 134 is located between impedances 122 and 124. A relay switch 32 is provided in the electrical path 130 adjacent connection point 134 such that the relay switch 132 provides an electrical connection between neutral 106 and live 108 at point 133 when in a closed position. The relay switch 126 in electrical path 116 is also located adjacent connection point 134. When closed, relay switch 126 completes the electrical path 116 connecting alternator 102 to live 108. The opposed arrangement of relay switches 126 and 132 shown in FIG. 2a and FIG. 8 is such that, when both are in their open positions, they complete the electrical path 130 from neutral 106 to live 108 via connection point 134.

Figure 8:
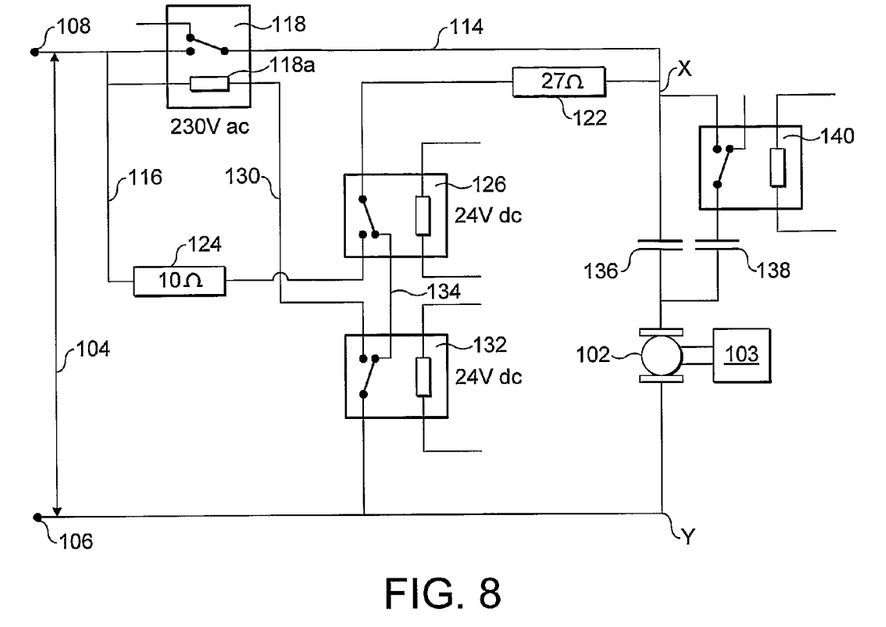
FIG. 8 is a further circuit diagram of the connector arrangement of FIG. 2a showing relay switches and better reflecting the physical arrangement of components.

FIG. 8 illustrates better the physical arrangement of the components of connector arrangement 100 and shows that electrical path 130 passes through a coil of the relay switch 118 such that the switch 118 is closed when a current flows through path 130 (via connecting point 133 only) to complete electrical path 114. The coil has an inherent impedance that is introduced into electrical path 130, as indicated at 118a.

Connection of the alternator 102 to the mains supply 104 will now be described.

The circuit shown in FIG. 2a is adopted when the Stirling engine 103 is idle and the alternator 102 is not connected to the mains supply 104. The circuit of FIG. 2a can be represented more simply by the circuit shown in FIG. 2b. The adjacent switches 126 and 132 are both open to connect neutral 106 and terminal 112 via connection point 134 such that the alternator 102 and capacitor 136 form a series circuit with the impedance 122. The impedance 122 is selected to be 27Ω as this is sufficient to ensure that the alternator 102 cannot produce enough current to pass through the impedance 122. Hence, the Stirling engine 103 is stalled and kept in a stationary condition.

To start operation, the Stirling engine 103 is brought into operating condition by applying heat to one end of its piston cylinder whilst cooling the other end. When the engine 103 is sufficiently warmed up, the alternator 102 is connected to the mains supply 104. The exact timing of this connection step is described in detail below.

Figure 3A:
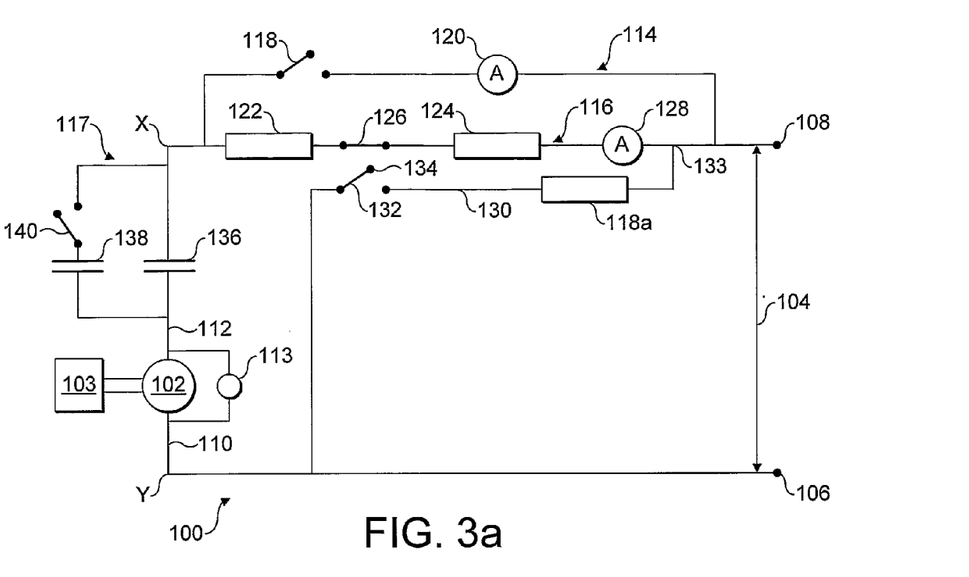
Figure 3B:
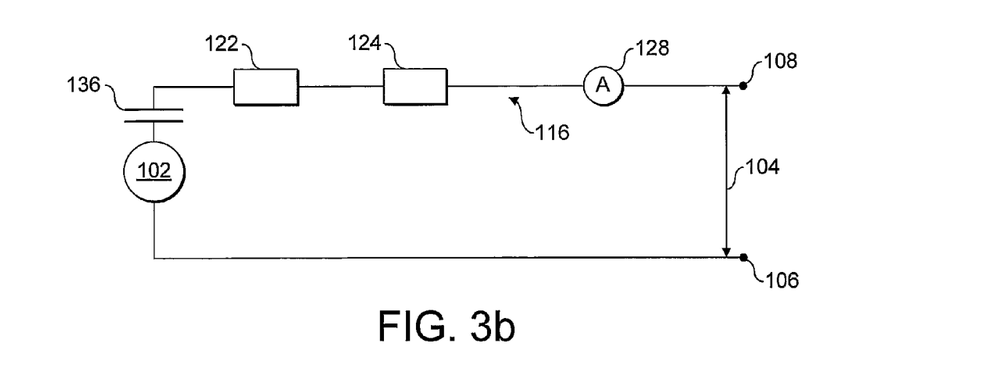

The engine's piston is initiated by connecting the alternator 102 to the mains supply 104. This is achieved by closing the relay switch 126 as shown in FIG. 3a to create an effective circuit as shown in FIG. 3b. The action of closing relay switch 126 breaks the electrical path connecting neutral 106 and terminal 112 via connection point 134, and instead completes electrical path 116 to connect the alternator 102 and capacitor 136 to the mains supply 104 via impedances 122 and 124 and meter 128. The particular total impedance value of the impedances 122 and 124 is selected dependant upon the particular Stirling engine 103 and alternator 102 combination that is used. In the present example, the total impedance has been selected at 37Ω. This dictates the current supplied from the mains 104 that passes through the coils of the alternator 102 and, in turn, dictates the force imported to the moving portion of the alternator 102 within the coils (in this case, the moving portion is the piston of the Stirling engine 103). The force imparted must be sufficient to start movement of the piston and yet must not be so excessive to drive the piston beyond its designed range of movement as this may damage the alternator 102 or Stirling engine 103.

The connection arrangement 100 of the present invention is particularly suitable for use with a Stirling engine 103 as the prime mover of the alternator 102 because the Stirling engine 103 can be brought into operation rapidly. Furthermore, starting the Stirling engine 103 by initiating the piston stroke using the mains supply 104 only requires a small amount of force because the piston is relatively light and can be accelerated from rest very easily. The piston stroke is continued during normal operation of the engine 103 by linear simple harmonic motion is driven by the alternating current of the mains supply 104.

Heating the Stirling engine 103 prior to connection to the mains supply 104 ensures that the alternator 102 produces electricity of a suitable power quality for the mains electricity supply 104. Using the alternating current of the mains supply 104 to initiate the piston stroke ensures the alternator 102 is driven at the same frequency and in phase with the mains supply 104.

The current meter 128 provided in electrical path 116 gives an indication of the current that flows through line 116 upon connection. After connection, the current measured by meter 128 is checked to ensure that it is within expected values. This check provides an indication that the impedances 122 and 124 and contact of the relay switches 118, 126, 132 and 140 are working satisfactorily. The current measured by meter 128 is read by a controller 142 that compares it with expected values to ensure that the connector arrangement 100 is functioning correctly. If the measured value is outside the expected values, the controller 142 performs an emergency shut-down procedure as is described later.

Under normal circumstances, the reading of meter 128 will be within expected values and so the controller 142 causes switch 132 to close to connect neutral 106 to line 108 along electrical path 130 via connection point 133. This switching operation produces the circuit shown in FIGS. 4a and 4b. The controller 142 makes the switching operation only after a delay of 500 ms after the previous switching operation.

Figure 4A:
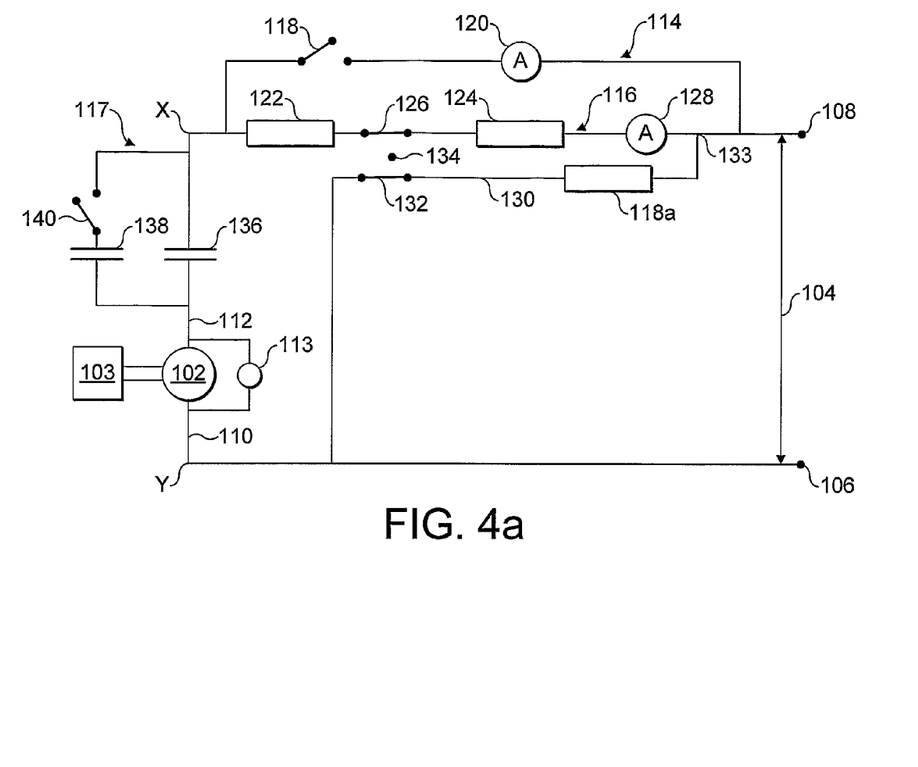
Figure 4B:
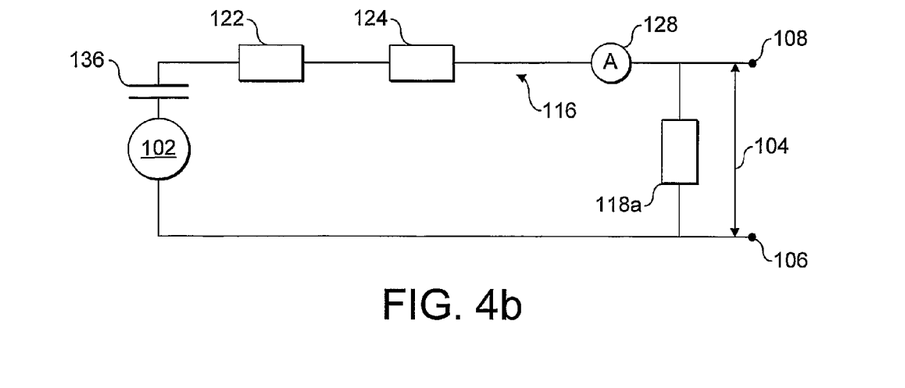
Figure 5A:
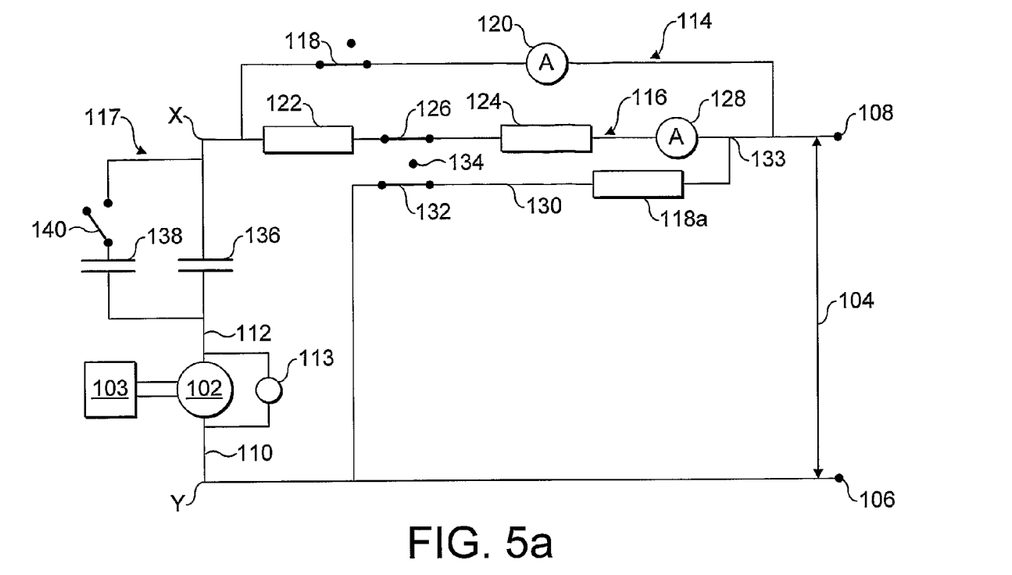
Figure 5B:
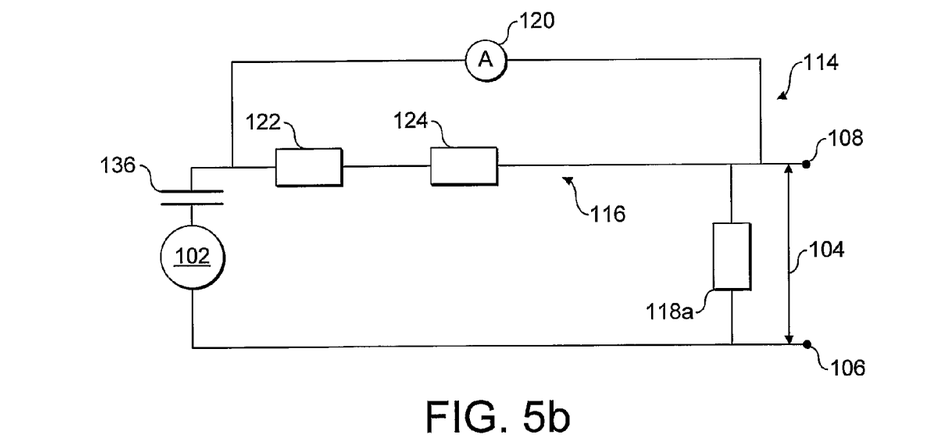

As was explained above, passing a current along the electrical path 130 from connection point 133 activates the relay switch 118 causing switch 118 to close, thereby producing the circuit shown in FIGS. 5a and 5b. The relay switch 118 closes after only a short delay and hence the circuit of FIGS. 4a and 4b is merely transitory. Closing switch 118 completes the electrical path 114 that links alternator 102 and capacitor 136 to mains electricity supply 104 and shorts out impedances 122 and 124. After a suitable period of time has elapsed for the current through line 114 to settle (e.g. 100 ms), the current through meter 120 is checked by the controller 142 to see whether it is within expected values. If it is not, the controller 142 initiates emergency shut-down procedures as are described below.

Figure 6A:
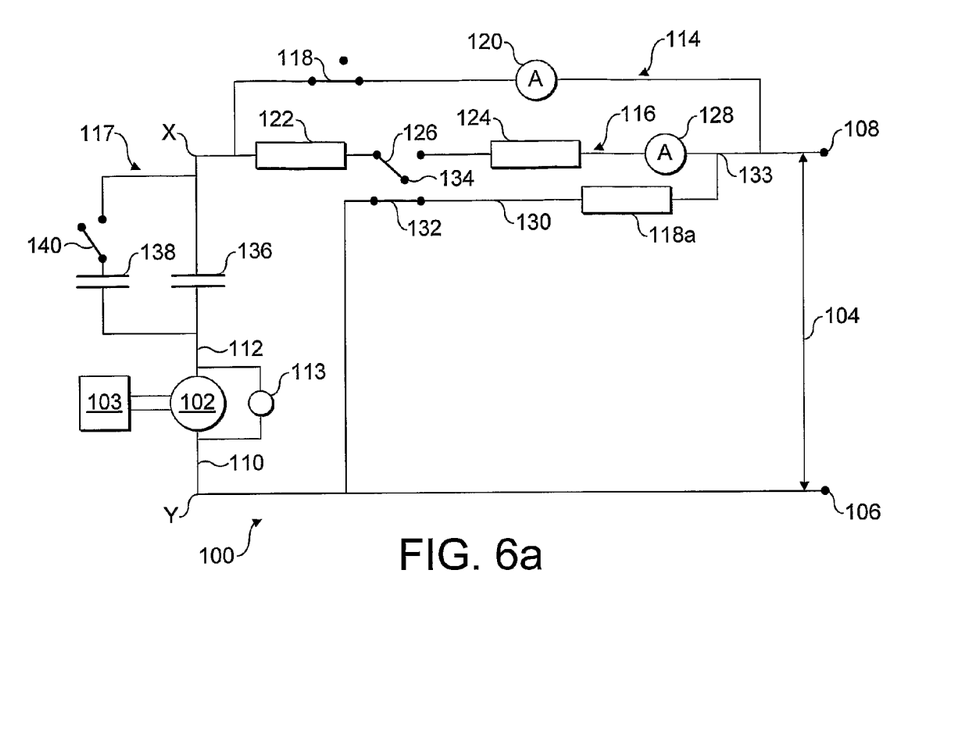
Figure 6B:
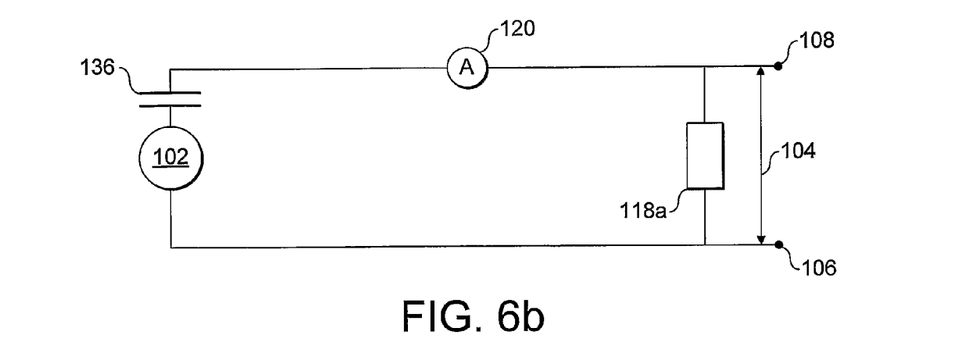

Under normal circumstances, the current will be within normal parameters and the controller 142 causes switch 126 to open to break electrical path 116 that includes impedances 122 and 124. Thus, the alternator 102 is now connected directly to the mains supply 104 as shown in FIGS. 6a and 6b. The impedance 118a in electrical path 130 is such that there is only negligible current flow along the path 130, such that the path 130 does not short out the alternator 102.

With alternator 102 connected to the mains supply 104 in this way, normal operation of the Stirling engine 103 may continue with the alternator 102 supplying electricity to or drawing electricity from the mains supply 104, as conditions dictate.

Figure 9:
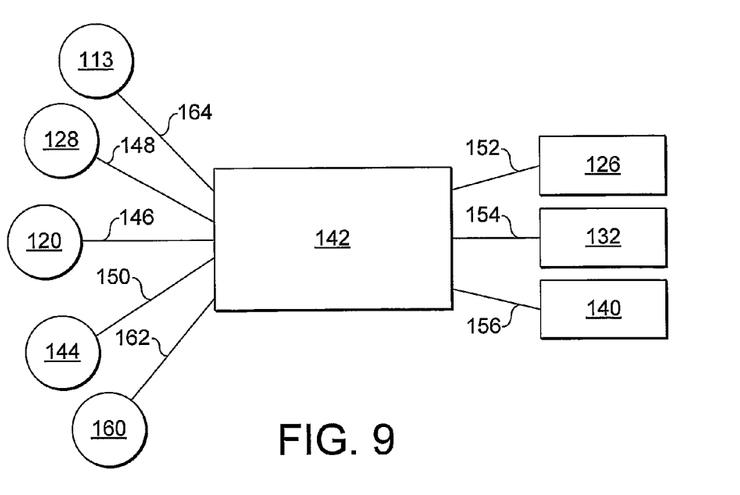
FIG. 9 shows a control system for controlling the relay switches in the connector arrangement.

As described above, operation of the connector arrangement 100 is managed by the controller 142 that may be a micro-processor or the like. The controller 142 is shown in FIG. 9 and is provided with data links 146, 148 and 164 to meters 120, 128 and 113 respectively, a data link 150 to the temperature detector 144 of the Stirling engine 103, and a data link 162 to a timer 160 (yet to be described). The controller 142 also has actuation links 152, 154 and 156 to the relay switches 126, 132 and 140 respectively. The actuation links 152, 154 and 156 supply 24V signals to activate the relay switches 126, 132 and 140.

Figures 10, 11:
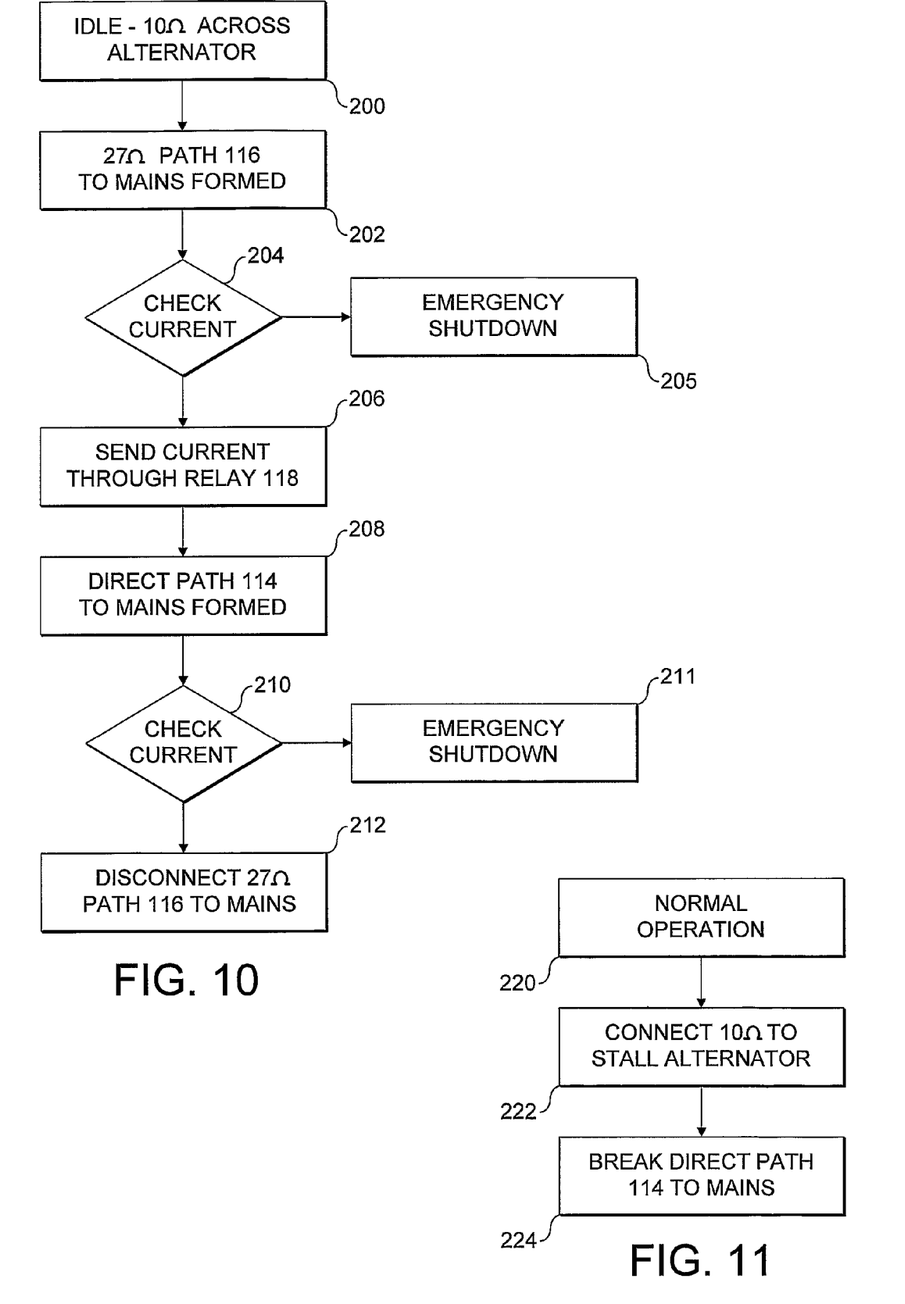
FIG. 10 shows a sequence that is followed by the control system to connect the alternator to the mains supply.
FIG. 11 shows a sequence of steps followed by the control system to disconnect the alternator from the mains supply.

The controller 142 manages switching of the connector arrangement 100 to connect the alternator 102 to the mains supply 104 as described above, and also the timing of the connection as will be described below. Switching of the connector arrangement 100 can be summarised as follows and as illustrated by FIG. 10.

Figure 2B:
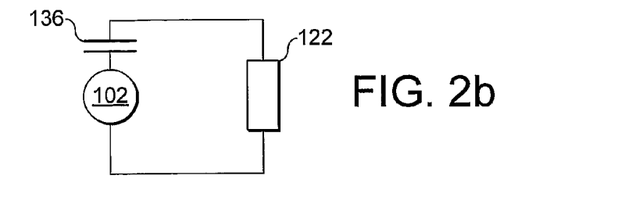

At 200, the Stirling engine 103 is idle and the alternator 102 and capacitor 136 are connected to impedance 122, as shown in FIGS. 2a and 2b. This corresponds to the following switching arrangement.

| Switch 118 | open |
|---|---|
| Switch 126 | open |
| Switch 132 | open |

Connection is initiated at 202, once the Stirling engine 103 has passed 180° C., by the controller 142 activating relay switch 126 to connect to the mains supply 104 via impedances 122 and 124 (as shown in FIGS. 3a and 3b). This corresponds to the following switching arrangement.

| Switch 118 | open |
|---|---|
| Switch 126 | open → closed |
| Switch 132 | open |

At 204, the current flowing through meter 128 is checked. If abnormal, an emergency shut-down is performed at 205. If normal, the controller 142 closes switch 132 at 206, after a 500 ms delay, to produce the circuit of FIGS. 4a and 4b thereby sending current to relay 118. This transitory circuit corresponds to the following arrangement.

| Switch 118 | open |
|---|---|
| Switch 126 | closed |
| Switch 132 | open → closed |

Current flow through relay 118 causes its switch to close after a short delay, thereby forming a short-circuit path 114 to the mains supply 104 as shown in FIGS. 5a and 5b, and as indicated at 208 of FIG. 10. This corresponds to the following arrangement.

| Switch 118 | open → closed |
|---|---|
| Switch 126 | closed |
| Switch 132 | closed |

At 210, the current flowing through meter 120 is checked. If abnormal, an emergency shut-down is performed at 211. If normal, and after a delay of 100 ms, the controller 142 opens switch 126 at 212 to break electrical path 116 through impedances 122 and 124. The alternator 102 is now connected directly to the mains supply 104, as shown in FIGS. 6a and 6b. This corresponds to the following switching arrangement.

| Switch 118 | closed |
|---|---|
| Switch 126 | closed → open |
| Switch 132 | closed |

The controller 142 also manages disconnection of the alternator 102 from the mains supply 104 using the connector arrangement 100, as will now be described.

When it is desired to disconnect the alternator 102 from the mains supply 104, the burner of the Stirling engine 103 is turned off and the remaining heat in the Stirling engine 103 is used up with the connector arrangement 100 remaining as shown in FIGS. 6a and 6b.

Figure 7A:
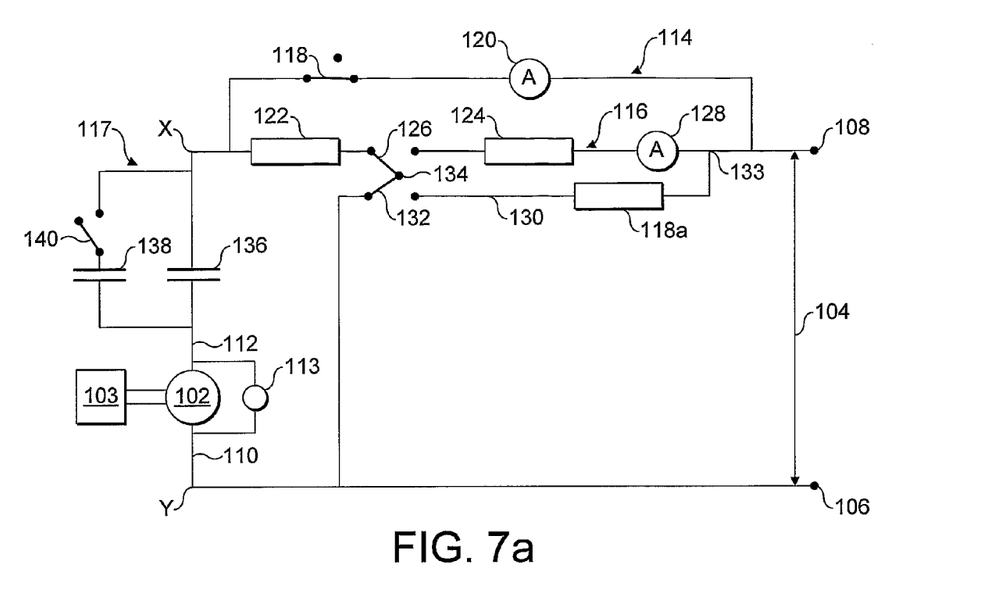
Figure 7B:
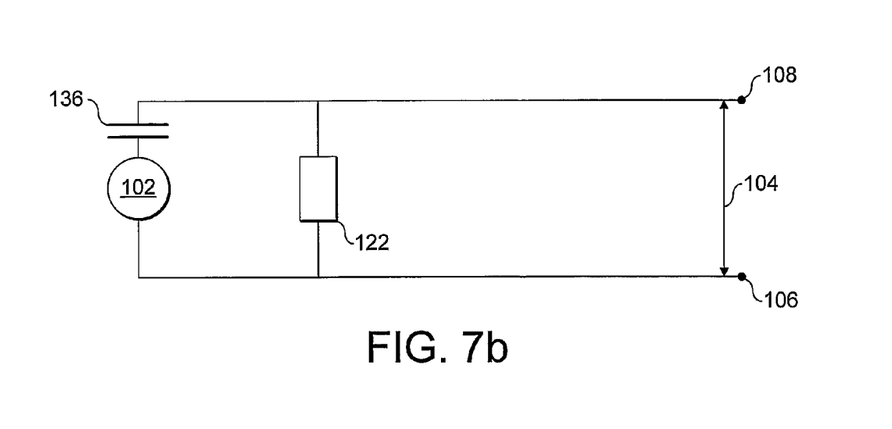

As the Stirling engine 103 burner head temperature drops, a point is reached where power is neither drawn from nor supplied to the mains supply 104. The burner head temperature corresponding to this point, at which disconnection occurs, is estimated from information stored from previous disconnections, as is described in further detail below. To begin disconnection, the controller 142 opens the switch 118 such that the circuit shown in FIGS. 7a and 7b is realised. The impedance 122 is placed across the alternator 102 once more, causing the Stirling engine 103 to stall because it cannot produce sufficient current to be driven through the impedance 122.

Opening switch 118 breaks the electrical path from connection point 133 that activates relay switch 118. Hence, after a short demagnetisation delay, the switch 118 opens to disconnect the alternator 102 from the mains supply 104. This returns the connector arrangement 100 to the state shown in FIGS. 2a and 2b. Substantially less or no arcing is produced upon disconnection because the demagnetisation delay ensures that the alternator 102 has already stopped.

The disconnection procedure using the connector arrangement 100 can be summarised as follows and is illustrated in FIG. 11.

Initially, the connector arrangement 100 is configured for normal operation as shown in FIGS. 6a and 6b and as indicated at 220 of FIG. 11. This corresponds to the following switching arrangement.

| Switch 118 | closed |
|---|---|
| Switch 126 | open |
| Switch 132 | closed |

The controller 142 than opens switch 132 at 222 to produce the circuit shown in FIGS. 7a and 7b. This places impedance 122 across the alternator 102 thereby stalling the alternator 102, and stops current flowing through relay 118. This corresponds to the following switching arrangement.

| Switch 118 | closed → open |
|---|---|
| Switch 126 | open |
| Switch 132 | closed |

Lack of current passing through the relay 118 causes its switch 119 to open at 224 after a short demagnetisation delay, thereby disconnecting the alternator 102 from the mains supply 104. The delay is sufficient to ensure that the alternator 102 has stopped prior to disconnection. This produces the circuit shown in FIGS. 2a and 2b, and corresponds to the following switching arrangement.

| | |
|---|---|
| Switch 118 | open |
| Switch 126 | open |
| Switch 132 | closed → open |

The above disconnection procedure corresponds to a controlled sequence of steps spread over a period of time. However, disconnection may be required more rapidly in an emergency situation, for example because the current detected at meters 120 or 128 is outside the normal values. In such an emergency situation, switch 132 is closed without waiting for the remaining heat from the Stirling engine 103 to be used up. This should prevent the alternator 102 from suffering any damage due to operation outside its normal conditions. The remainder of the disconnecting procedure is as explained above.

Figure 13:
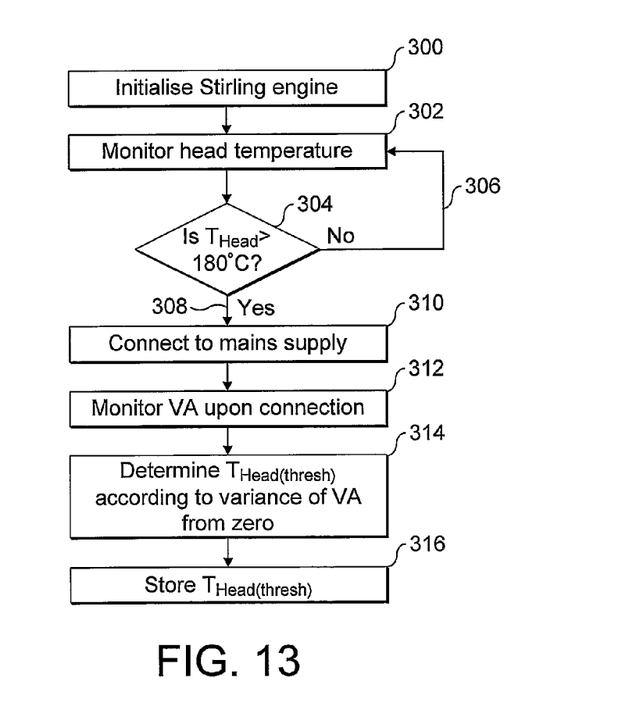
FIG. 13 shows the sequence of steps followed to determine the time to connect the alternator to the mains supply the first time the Stirling engine is used.
Figure 14:
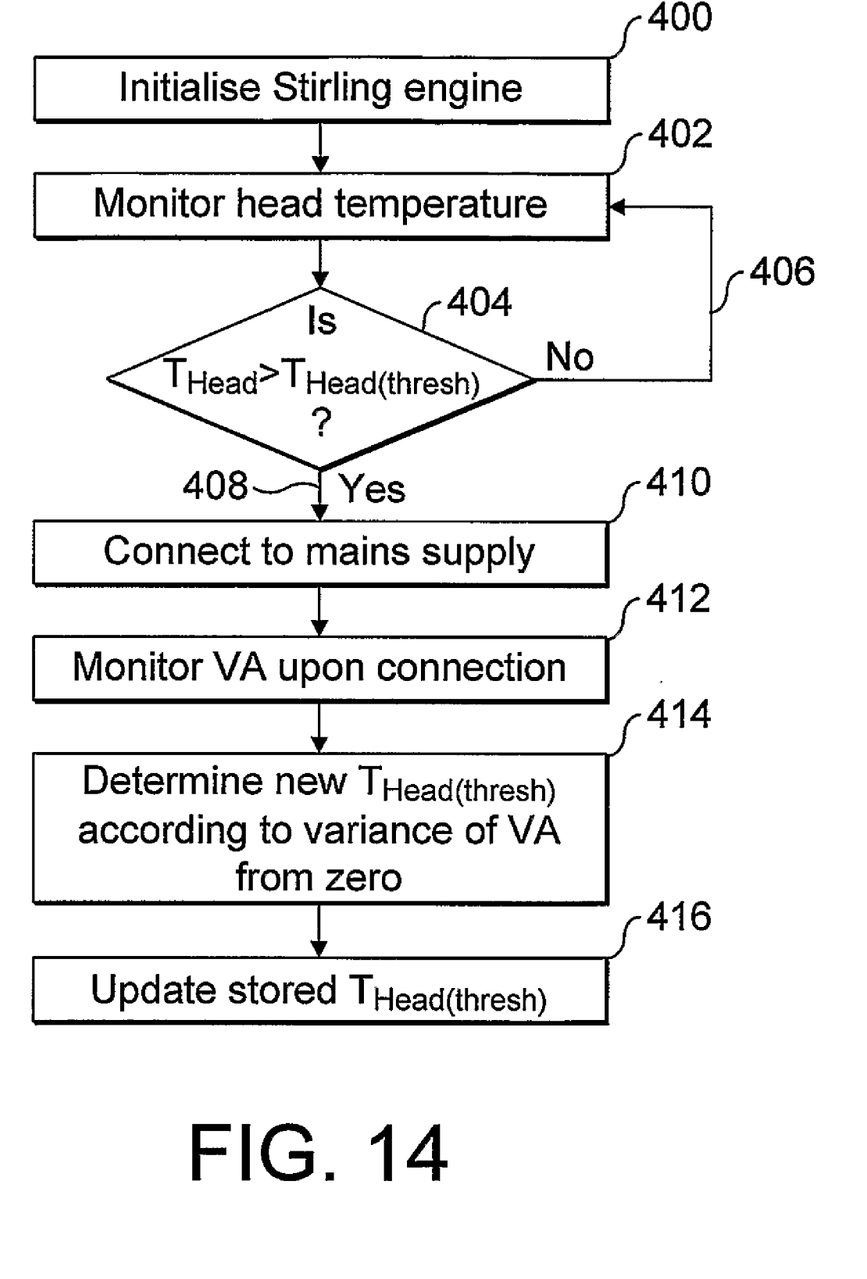
FIG. 14 corresponds to FIG. 13, but shows the sequence of steps for subsequent connection of the alternator to the mains supply.

The method for determining when the alternator 102 is connected to the mains supply 104 will now be described with reference to FIGS. 13 and 14. FIG. 13 corresponds to the method followed the first time the Stirling engine 103 is connected to an alternating current circuit, such as the mains supply 104. FIG. 14 shows the method that is followed on subsequent occasions. The first connection shown in FIG. 13 may be performed as part of a pre-delivery inspection and test prior to the Stirling engine being despatched for delivery, or part of a commissioning procedure by an installation engineer, or by a consumer when they first use an installed unit. Moreover, the method shown in FIG. 13 may be used subsequently during the engine's lifetime, for example following a system reset or after a service.

Looking now at FIG. 13 in more detail, the Stirling engine 103 is initialised at 300 by heating one end of its piston cylinder whilst cooling the other end, as has already been described above. The ensuing rise in temperature of the Stirling engine 103 is monitored at 302 by the controller 142 using the temperature detector 144 via the data link 150. The temperature detector 144 is positioned to measure the temperature of the burner head $T_{Head}$ of the Stirling engine 103.

At 304, the controller 142 determines whether the latest received value for $T_{Head}$ is greater than 180° C. If not, the controller 142 continues to read $T_{Head}$ measurements, as indicated by loop 306, and compare them to the 180° C. threshold. When a $T_{Head}$ value greater than 180° C. is received, the method continues along path 308 to 310 where connection to the mains supply 104 is effected, as described above. In this embodiment, a single value of $T_{Head}$>180° C. is enough for the controller 142 to effect connection of the alternator 102 to the mains supply 104. Alternatively, other conditions could be set. For example, the controller 142 may wait until the second, third, etc., instance of a value of $T_{Head}$>180° C. before effecting connection, or may use an average of two, three, etc. consecutive values to exceed 180° C. before effecting connection. Such conditions may guard against connections triggered by spurious readings caused, for example, by noise or by temporary "hot spots" around the temperature detector 144 location that may arise from imperfect heat distribution in the Stirling engine's burner head.

The connection procedure performed at 310 has already been described in detail. The circuit that corresponds to the moment of connection is shown in FIGS. 3a and 3b. As can be seen, path 116 includes a meter 128 that monitors the current flowing along path 116, i.e. the current flowing from alternator 102 to mains supply 104 or vice versa. This current reading is passed to the controller 142 via data link 148. In addition, the controller 142 also receives the voltage across the alternator 102 from the meter 113 via data link 164. Hence, at 313 the controller 142 determines the product VA of the current and voltage, thereby determining the amount of electricity flowing out of or into the alternator 102. Ideally, this product VA should be zero upon connection and should then rise.

The controller 142 determines the product VA upon connection, either by multiplying single values of current and voltage, or by averaging (either values of current and voltage before determining the product, or the product values themselves). In this embodiment, the controller 142 measures the current and voltage for a pre-determined period of 5 seconds following connection, and takes an average of the products. This average product VA is compared to a look-up table at 314 that provides a new threshold temperature $T_{Head(thresh)}$ to be used to trigger connection during the next start-up of the Stirling engine.

The look-up table defines the relationship between the variance of VA from zero and the adjustment to be made to the temperature value that triggers connection. For example, a positive value of VA (in this embodiment, a convention is used such that positive VA's indicate electricity flow from alternator 102 to mains supply 104 and negative VA's indicate electricity flow from mains supply 104 to alternator 102) will lead to a decrease from the previously used trigger temperature, i.e. 180° C. in this example as it was the first use of the Stirling engine 103. The more positive VA, the greater the decrease from 180° C. This ensures that less electricity should be delivered by the alternator 102 upon the next connection. Similarly, if VA is found to be negative, then a temperature higher than 180° C. is used for the next connection to try to avoid the need to draw electricity from the mains supply 104 to motor the Stirling engine 103. The more negative VA, the greater the increase in temperature from 180° C. Thus, a new trigger temperature $T_{Head(thresh)}$ is determined at 314 that is stored by the controller 142 at 316 ready for retrieval by the controller 142 during the next start-up and connection procedure.

Alternatively, another arrangement may be used that is the same as the arrangement described except where specified otherwise. This alternative arrangement does not rely on voltage measurements from the alternator 102 and so the voltmeter 113 is not present in this alternative arrangement. Instead of the power being calculated by the controller 142 from the current and voltage measurements, the controller uses only current measurements to determine the amount of electricity flowing through the alternator 102. In other words, in this alternative arrangement the controller does not calculate the product of the current and voltage (VA) to determine the amount of electricity flowing through the alternator 102 but instead uses the current (A) measurement only.

Ideally, the current A should be zero at the connection time in this alternative arrangement. A similar look-up table is used to that described above. However, this look-up table is based on the current A to define the relationship between the temperature value and the amount of electricity flowing (and its direction) through the alternator 102. A negative value of the current A corresponds to electricity flowing from mains supply 104 to alternator 102 and a positive value of the current A corresponds to electricity flowing from alternator 102 to mains supply 104.

FIG. 14 shows the method followed for the next and other subsequent start-up procedures. This method essentially corresponds to the method of FIG. 13, and so repetitive description will be avoided and corresponding reference numerals are merely incremented by 100.

The method of FIG. 14 differs in that, at 404, the values of $T_{Head}$ are compared against the stored value of $T_{Head(thresh)}$, rather than a fixed temperature of 180° C. When $T_{Head(thresh)}$ is exceeded (however determined, as discussed above), the controller 142 initiates connection to the mains supply 104 at 410, as described with reference to FIG. 13.

A value of $T_{Head(thresh)}$ is determined at 414, as discussed with respect to 314 of FIG. 13. If this value varies from the current value of $T_{Head(thresh)}$ by more than an allowed range, the stored value is updated by the controller 142 at 416.

Hence, in this way an adaptive system is realised that ensures the optimum connection time is determined quickly and is followed thereafter. Moreover, any drift in the optimum connection temperature will also be followed by this adaptive method.

The exact nature of the look-up table will depend upon the particular Stirling engine 103 and alternator 102 arrangement. More specifically, the particular arrangement will determine the relationship between the variation from zero and the size of the correction to $T_{Head(thresh)}$. As will be appreciated, the values may be determined empirically. Moreover, the choice of the exact implementation may be chosen freely. For example, a look-up table using values placed into bands is used in this embodiment: the choice of how many bands and their widths can be freely chosen. Furthermore, a look-up table need not be used. Instead a relationship may be determined for the controller 142 to use, e.g. Z=–KY+A where Z is the required change in the trigger temperature $T_{Head(thresh)}$, Y is the value for the product VA, and K and A are constants that may be determined for a particular Stirling engine by experiment, for example.

The method for disconnecting the alternator 102 from the mains supply 104 is more straightforward than the method of connection, and is the same for the first and all subsequent disconnection procedures. It can be summarised as:

(1) the heater of the Stirling engine 103 is turned off and heat is slowly used up by the engine 103 as it runs down, as described above;

(2) during this running down, the controller 142 measures the product VA using the meter 113 to measure the voltage across alternator 102 and the meter 120 via data link 146 to measure the current (at this point, the circuit is in the configuration shown in FIGS. 6a and 6b); and (3) when VA is determined to have reached zero, the controller 142 effects disconnection of the alternator 102 from the mains supply 104, as described previously.

Determining when VA reaches zero can be performed in different ways. For example, disconnection can be effected as soon as a value of the product VA reaches zero (or becomes negative). Alternatively, as described above with respect to the connection method, two, three or more zero or negative values may be required to trigger disconnection, or an average over consecutive values may be used.

In the alternative arrangement without the voltmeter, the controller 142 will monitor the value of the current A to determine when disconnection should take place (when the current A falls to zero).

The above connection and disconnection methods enjoy the following advantages:
they allow smooth, quiet connection and disconnection, to the benefit of the user;
they reduce the likelihood of over-travel in the Stirling engine's piston, that may otherwise cause damage to the engine 103 or cause a shutdown of the engine 103 that requires a service call-out to reset the engine 103; and
they ensure economical operation of the Stirling engine 103 with reduced drawing of electricity from the mains supply 104 to motor the engine 103 and fewer missed opportunities to sell electricity to the mains supply 104 or to provide electricity to the user.

The above are descriptions of controlled connection and disconnection procedures performed during normal operation. However, the emergency shutdown procedures mentioned above take precedence and will be implemented in favour of the controlled connection and disconnection procedures if abnormal readings are measured by any of the meters 120, 128 or 113. Emergency shut-down sees the alternator 102 disconnected from the mains supply 104 immediately, i.e. without waiting for the product VA (or the current A in the alternative arrangement where only current is measured) to fall to zero.

Data may be collected during the connection and disconnection procedures to allow diagnosis of the performance of the Stirling engine 103. During the connection procedure, the controller 142 calculates a new value for the threshold temperature $T_{Head(thresh)}$ each time connection is performed that is used for the next connection. In addition, the controller 142 saves the new value $T_{Head(thresh)}$ to a data file that logs the threshold temperature $T_{Head(thresh)}$ calculated by the controller 142 upon each connection. As the performance of the Stirling engine 103 varies, the temperature of the burner head of the Stirling engine 103 at which current is neither supplied nor drawn to the alternating current circuit when the alternator is connected will also vary. This change in ideal connection temperature can be identified in the data file that is recorded as trends in the variation of threshold temperatures $T_{Head(thresh)}$ stored therein.

In addition, the controller 142 also creates a further data file that logs data accumulated during disconnection procedures. A timer (not shown) is used that times the interval between when the heater of the Stirling engine 103 is turned off at step (1) described above and when the controller 142 measures the product VA to be zero at step (2) described above. This time is supplied to the controller 142 and is stored in the further data file. The data file may later be analysed to look for variations in the time taken for the running down procedure. This time will be indicative of the performance of the Stirling engine 103 and any variation in the timings may indicate a fault in the operation or condition of the Stirling engine 103.

In this way, data can be collected and later analysed that is indicative of the performance of the Stirling engine 103. The data collected during connection procedures is likely to complement data collected during the disconnection procedure. Hence, analysis of this data may lead to the indication of a fault within the Stirling engine 103 and/or of gradual deterioration in the performance of the Stirling engine 103. Thus, the method may indicate a fault within a Stirling engine that needs immediate attention or may indicate a developing fault within a Stirling engine 103. this will require attention in time.

Figure 12:
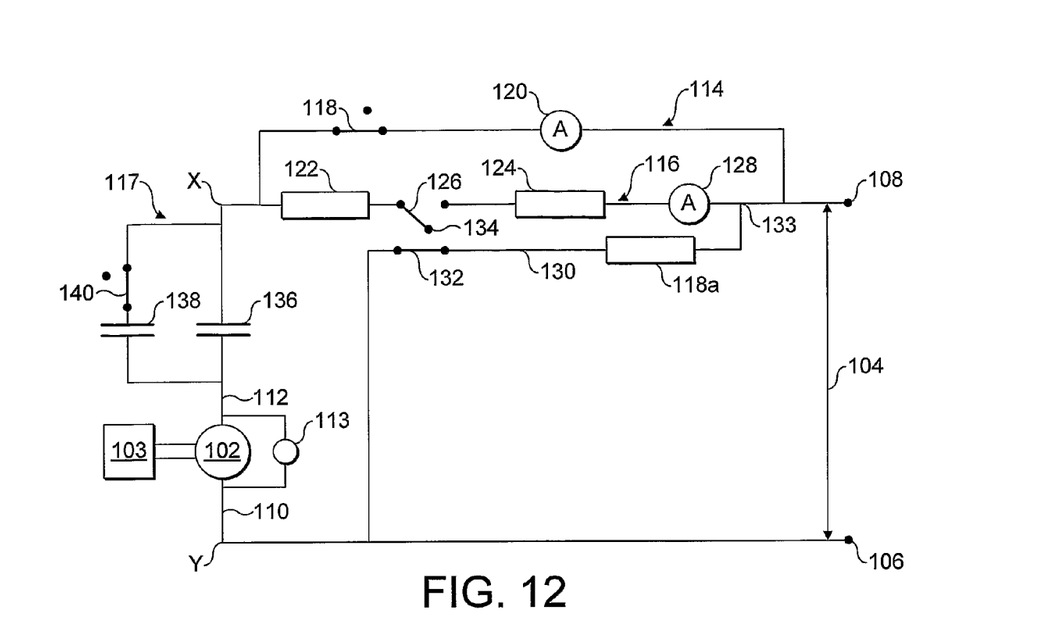
FIG. 12 corresponds to FIG. 6a but shows an arrangement corresponding to a detuned circuit.

A further improvement to operation of the above circuits will now be described. As mentioned above, an adjustable capacitor arrangement 117 is placed on the live-side of the alternator 102 to provide an adjustable resonance that allows the circuit to be tuned or detuned relative to the initial operating frequency of the Stirling engine 103. The capacitor arrangement 117 comprises a first capacitor 136 placed in series and adjacent to the alternator 102, and a second capacitor 138 and relay switch 140 placed in parallel around the first capacitor 136. The capacitances of the first 136 and second 138 capacitors are 40 μF and 5 μF respectively. With switch 140 open, as shown in FIGS. 2a to 7a, current may flow through the first capacitor 136 only and so the alternator 102 sees a capacitance of 40 μF: this corresponds to a circuit between points X and Y that is tuned to the operating frequency of the Stirling engine 103 when started from cold. With switch 140 closed, as shown in FIG. 12, current may flow through both first 136 and second 138 capacitors and so the alternator 102 sees a capacitance of 45 µF: this corresponds to a circuit between points X and Y that is detuned relative to the initial operating frequency of the Stirling engine 103, but that is tuned to the operating frequency of the Stirling engine 103 when at its normal working temperature.

We have found that it is best to use a circuit for connecting the alternator 102 to the mains supply 104 upon starting the Stirling engine 103 from cold conditions that is tuned to these cold conditions. Such a circuit corresponds to switch 140 being open as shown in FIG. 2, that is with the impedance 122 across the alternator 102 to keep the Stirling engine 103 stationary and with switch 140 open to provide a tuned circuit when connection is desired. Such a tuned circuit provides minimal residual inductance between points X and Y. We have found this to be beneficial as it reduces starting transients that may otherwise cause internal collisions of the piston and displacers of the Stirling engine 103 during connection to the mains supply 104. Transients occur during start-up in cold conditions due to an increase in the helium pressure in the Stirling engine 103 that accompanies heating of the engine 103. The pressure rise causes the resonant frequency of the gas spring that ensures reciprocating motion of the piston to change. It is the resonant frequency of the gas spring that determines the frequency of the signal produced by the alternator 102.

However, we have also found that in order to maintain stable operation of the Stirling engine 103 when connected to the mains supply 104, particularly where the engine 103 temperature is high, use of a detuned circuit that is detuned relative to the initial operating frequency of the Stirling engine 103 is beneficial. Preferably, the resonant frequency may be adjusted such that it follows the resonant frequency of the Stirling engine 103 as it comes up to working temperature. This is achieved by increasing the capacitance between points X and Y.

In one embodiment of the present invention, the time elapsed since operation of the Stirling engine 103 was first started by heating the engine 103 is counted with a timer 160. The timer 160 is connected to the controller 142 via a data link 162. Obviously, the temperature of the engine 103 rises during this period and passes 180° C. such that connection of the alternator 102 to the mains supply 104 is initiated. When seven minutes has elapsed, operation in tuned-circuit mode is switched to operation in detuned-circuit mode.

Similarly, operation of the switch 140 is performed during the disconnection process to switch from detuned operation to tuned operation. Whilst this can be performed using a fixed time delay from when the heater of the Stirling engine 103 is turned off, it is presently preferred to operate switch 140 when the engine head temperature passes through a set temperature of 200° C. as measured by the temperature detector 104. This temperature is such that, generally, the connector arrangement 100 is set to tuned circuit mode before VA (or the current A in the alternative arrangement) reaches zero and the disconnection process begins.

It will be evident to the skilled person that variations may be made to the above embodiment without departing from the scope of the claims.

FIGS. 2 to 8 shows a circuit indicating a Stirling engine 103 to be connected to a mains supply 104. The Stirling engine 103 may be part of a domestic combined heat and power unit. However, the circuit is but merely an example of a circuit for connecting a prime mover driver alternator to a circuit with an existing alternating current and many other possibilities exist. Some of the other possible prime movers, and corresponding connecting circuits have been described above, others are described below.

The above embodiment uses a timer to count the time elapsed since starting the Stirling engine 103 and that causes the controller 142 to trigger the switch from tuned to detuned relative to the initial operating conditions of the Stirling engine 103. However, other parameters could by used such as the engine's internal pressure e.g. the pressure of the working gas (Helium), of the engine 103 or any other signal related to the natural frequency of the Stirling engine 103. Alternatively, the temperature of the Stirling engine 103 that is measured directly by temperature detector 144 may be used to trigger switching between tuned and detuned operation.

Specifically, the controller 142 periodically reads the temperature measured by the temperature detector 144 located in the Stirling engine 103 via the data link 150 every fifteen seconds. The controller 142 compares the temperature measured to a threshold temperature of 300° C. to determine whether the measured temperature is higher or lower than the threshold. The controller then compares this value with the current state of switch 140 and activates the switch 140 via actuation link 156 if necessary, according to the following logic table.

| TEMPERATURE | SWITCH STATE | ACTION |
|---|---|---|
| low | open | none |
| high | open | close switch |
| high | closed | none |
| low | open | open switch |

This process is performed continuously and is wholly independent of the connection and disconnection procedures described above, i.e. operation of relay switch 140 by the controller 142 is independent of the operation (and its timing) of relay switches 118, 126 and 132. Exactly when the threshold temperature is reached is dependent upon several factors, such as the starting temperature of the Stirling engine 103 (as influenced by the ambient temperature or time elapsed since previous operation of the engine 103) and heat applied to the engine 103. Accordingly, operation of switch 140 may occur while the engine 103 is being heated prior to initiation of the piston with the connector arrangement 100 corresponding to FIG. 2a, connection of the alternator 102 to the mains supply 104 with the connector arrangement 100 corresponding to any of FIGS. 3a to 5a, or after connection is complete with the connector arrangement 100 corresponding to FIG. 6a. Similarly, operation of the switch 140 may occur during disconnection as the Stirling engine 103 is stopped and allowed to cool.

The above embodiment uses but merely one type of capacitor arrangement 117 that allows the capacitance between points X and Y to be varied. The choice of capacitance values can be varied to suit needs and other alternatives such as a variable capacitor at 138 or at 136 may be used. In fact, the capacitor arrangement 117 could be replaced by a single variable capacitor. Use of variable capacitors may be beneficial as this would allow flexible and continuous tuning of the connector arrangement 100 to the operating frequency of the Stirling engine 103 under all operating conditions, whilst giving rise to only minimal losses within the circuitry at all times. This may be implemented using a feedback loop, for example.

Moreover, using a variable capacitance is but only one way of switching the connector arrangement 100 between tuned and detuned operation. For example, an arrangement of inductors may be used in the place of capacitors such that the connector arrangement 100 is provided with a variable inductance rather than with a variable capacitance.

The values of impedances 122 and 124 are merely offered as examples and are in no way intended to be limiting. The values of impedances 122 and 124 may be freely varied.

The invention in its broadest sense applies to connection of a prime mover driven alternator to a circuit with an existing alternating current. As such, the Stirling engine 103 of the above embodiment is presented merely as an example of a prime mover that drives an alternator 102 and the mains supply 104 is but merely an example of a circuit having an alternating current.

The use of a mechanically activated switches is preferred, but not essential, to perform the shutdown sequence, rather than using an external timing device as it enables shut down to be performed even in the event of loss of supply. The connector arrangement 100 described above provides both a reliable mains supply connection and a safe instant disconnection in the event of a loss of the mains supply 104. The connector arrangement 100 is able to provide both connection and disconnection from the mains power supply 104 with the same components thus lowering the component count by providing dual functionality.

As well as using the full connector arrangement design, part of the connector arrangement may be used for a particular connection or disconnection application. For example, the disconnection circuit could be used for a stand alone generator and the connection circuit could be used for grid independent starting.

The invention claimed is:

1. A method of connecting a prime mover driven alternator, arranged to generate a current between two terminals, to an alternating current circuit with an existing alternating current, the method comprising the steps of:
   (a) initialising the prime mover so that it reaches a suitable condition to drive the alternator at the frequency of the alternating current in the circuit to which it is to be connected;
   (b) measuring a parameter indicative of the amount of electricity that will be supplied or drawn by the alternator when connected to the alternating current circuit;
   (c) connecting the terminals of the alternator to a circuit with an existing alternating current to cause the alternator to start movement of the prime mover when the measured parameter reaches a predetermined threshold;
   (d) measuring the amount of electricity supplied or drawn by the alternator substantially immediately upon connection; and
   (e) updating the value of the predetermined threshold in accordance with the measured amount of electricity.

2. A method according to claim 1, wherein step (e) comprises increasing or decreasing the predetermined threshold if the measured amount of electricity shows that electricity is being drawn from or supplied to the alternating current circuit respectively.

3. A method according to claim 2, further comprising increasing or decreasing the predetermined threshold in proportion to the amount of electricity being drawn from or supplied to the alternating current circuit.

4. A method according to claim 1 further comprising, concurrent with steps (b) and (c), monitoring a second parameter of the prime mover and adjusting the resonant frequency of a circuit between a first resonant frequency tuned to an initial operating frequency of the prime mover and a second resonant frequency detuned to the initial operating frequency when the parameter passes through a second threshold value.

* * * * *